United States Patent [19]

Neier

[11] 4,085,869

[45] Apr. 25, 1978

[54] LEVER-OPERATED FEED DISPENSER

[75] Inventor: Benjamin Ray Neier, Dodge City, Kans.

[73] Assignee: B J Manufacturing Company, Inc., Dodge City, Kans.

[21] Appl. No.: 746,698

[22] Filed: Dec. 2, 1976

[51] Int. Cl.² .................................................. B65G 33/14
[52] U.S. Cl. .................................... 222/271; 222/533
[58] Field of Search .............. 222/238, 533, 536, 627, 222/271, 272, 413; 259/41, 104

[56] References Cited

U.S. PATENT DOCUMENTS

| 2,915,180 | 12/1959 | MacGillivray | 222/533 X |
| 3,334,760 | 8/1967 | Bolinger et al. | 222/413 X |
| 4,036,411 | 7/1977 | Westhoff | 222/413 |

*Primary Examiner*—Stanley H. Tollberg
*Attorney, Agent, or Firm*—Cook, Wetzel & Egan, Ltd.

[57] ABSTRACT

An improved feed dispenser for conveying mixed feed from a discharge opening of a mixing hopper and for directing the flow of feed exiting the dispenser, said dispenser including a trough contoured to an auger; a slideably disposed outlet door between the mixing hopper and the trough; a retractable, hingedly disposed spout for directing the flow of feed during dispensing and for closing the trough at other times to prevent feed loss; and fluidic cylinder operated lever structure for simultaneously sliding the outlet door to open the flow of feed to be engaged by the auger and for lowering the spout for directing the flow of mixed feed from the trough.

12 Claims, 5 Drawing Figures

LEVER-OPERATED FEED DISPENSER

BACKGROUND OF THE INVENTION

The present invention relates generally to the feed mixing art and more specifically to an improved feed dispenser for conveying mixed feed from a mixing hopper to a cattle feeder.

The feed mixing art has developed from agricultural and biological studies which have indicated that a properly balanced diet is necessary in cattle feeding for optimum weight gain and improved meat texture. Accordingly, it has been necessary to mix various natural grains with additional nutrients, fortifiers, vitamins and minerals to formulate a uniformly dispersed mixed feed. Various mechanical means have been developed for accomplishing this purpose. Some feed mixers of the prior art have been mounted on a truck bed in order to utilize a single mobile apparatus, both for mixing the feed and for transporting it to the point of consumption, the feed lot. Upon transporting the mixed feed to the feed lot it is then necessary to dispense a controlled amount of mixed feed into the cattle feeders. Presently, the approach to cattle feeding technology is to maintain each steer being fed within a confined area for maximum efficiency of growth rate and optimum meat texture. That confinement has necessitated the use of individual feeders, as the cattle may not freely roam to feed from a communal feeder. In those circumstances, efficient and automatic dispensing of the mixed feed becomes especially important.

In the prior art, several different mechanized feed dispensers for use in connection with a mobile feed mixer have been developed. However, certain difficulties have been associated with such prior art feed dispensers. In some cases an excessive amount of manual control has been necessary for efficient dispensing of the feed. The design of other feed dispensers of the prior art has made them suitable for feed dispensing, but unsuitable for use in connection with a mobile feed mixer, which has limited their usefulness.

Accordingly, it is an object of the improved feed dispenser apparatus of the present invention materially to alleviate the difficulties associated with the prior art devices.

It is an additional object of the improved feed dispenser apparatus of the present invention to provide for a maximum of automatic operation and a minimum of manual control.

It is a further object of the improved feed dispenser apparatus of the present invention to provide means for automatically communicating the feed mixing hopper with an auger drive and for automatically extending a feed spout for directing the flow of feed into the cattle feeders.

SUMMARY OF THE INVENTION

The improved feed dispenser apparatus of the present invention includes an auger drive communicating with the discharge opening of the accompanying mixing hopper, which hopper is preferably mounted on a truck bed for transportation. The auger is contained within a trough to channel the feed upwardly from the hopper to dispense a controlled amount of feed to the cattle feeders. A slideably disposed outlet door separates the discharge opening of the mixing hopper from the auger when the unit is not in operation. Prior to dispensing, the outlet door is tracked upwardly by means of a bar and lever mechanism driven by a fluidic cylinder to open the mixing hopper to the augers. A retractable spout is hingedly mounted on the auger trough for covering the trough opening during transporation and for extending downwardly during dispensing to direct flow of feed into the cattle feeders. The retractable spout is equipped with an elbow hinge also driven by fluidic cylinder means to extend and retract the spout. Both the fluidic cylinders may be activated by a common switch simultaneously opening the slideable outlet door and extending the feed spout to dispense the mixed feed. Whereupon, after dispensing, the outlet door may be closed simultaneous to retraction of the feed spout prior to transportation to prevent any loss of feed.

Various modifications of the improved feed dispenser apparatus of the present invention are intended to be embodied and will become apparent to those skilled in the art from the teaching of the principles of the invention in connection with the disclosure of the specification, the claims and the drawing.

DETAILED DESCRIPTION OF PREFERRED EMBODIMENTS

Figure 1:
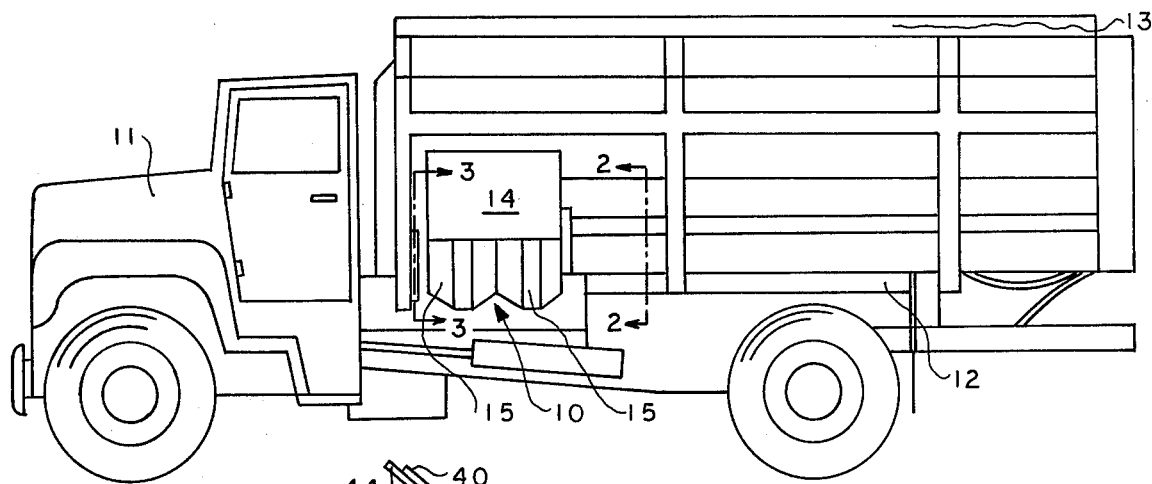
FIG. 1 is a schematic side elevational view of the improved feed dispenser apparatus of the present invention shown in conjunction with the accompanying truck-mounted feed mixing hopper, showing the exterior surface of the auger troughs covered by the spout in retracted disposition as for transportation.

The improved feed dispenser apparatus of the present invention functions efficiently and automatically to convey mixed feed from a discharge opening of a mixing hopper, which is preferably mounted upon a truck bed, to cattle feeders for consumption.

In the apparatus of the present invention at least one auger communicates with such discharge opening of the mixing hopper to convey the mixed feed for discharge. Preferably, the auger is disposed at an angle between vertically and horizontally for a minimum of lateral protrusion from the truck bed to avoid striking objects during transportation. The auger is confined within an auger trough for channeling the feed upwardly in conjunction with the augers.

An outlet door is slidably disposed between the discharge opening of the mixing hopper and the auger trough, such that prior to dispensing the outlet door may slide upon its tracks upwardly to open the discharge opening to the augers for conveying the mixing feed. The slidable outlet door is driven by a pivotable lever connected to a fluidic cylinder. The lever is fulcrumed at a central portion thereof and is preferably carried by the trough wall. A bar is pivotably mounted preferably to the lower portion of the slidable outlet door and connected to one end of the lever, the other lever end driven by the fluidic cylinder, whereby retraction of the fluidic cylinder operates the centrally fulcrum lever to slide the outlet door upwardly and to open the hopper to the auger. Extension of the fluidic cylinder reciprocally functions to close the slidable outlet door.

The auger trough is equipped with a retractable spout. Preferably, the spout is hinged to a lip portion of the auger trough, for retraction to cover the auger trough as during transportation, and for extension to hinge the spout downwardly as during operation of the augers to direct the mixed feed into the cattle feeders. The retractable spout is operated by means of another fluidic cylinder attached to a centrally foldable elbow hinge. One end of the elbow hinge is pivotably secured, preferably to the external surface of the trough side portion, and the other end of the foldable elbow hinge is pivotably connected to the retractable spout. The spout is retracted upwardly to close the auger trough by means of retraction of its associated fluidic cylinder, which folds the elbow hinge to cause the spout to turn upwardly on the spout hinge. Extension of the fluidic cylinder serves to unfold the elbow hinge, whereby the spout turns on its hinges and extends downwardly for conducting feed into the cattle feeders.

In a preferred embodiment the auger trough is of truncated triangular shape in cross-section, as shown in the Figs. However, in alternative embodiments the auger trough may be concave and partially cylindrical. But in either embodiment the auger trough is closely disposed to and generally contoured to the auger through approximately 120°-180° of its transverse cross-section for efficiency of conveying.

The two fluidic cylinders driving the retractable spout and the slidable outlet door may be connected to a single control switch for simultaneously opening the outlet door and retracting the feed spout downwardly, as during dispensing feed. Preferably, the auger drive is controlled by a separate initiating control switch for selective and controlled dispensing of the mixed feed to prevent waste.

Referring now to the Figs. and FIG. 1 in particular, the improved feed dispenser apparatus of the present invention as shown generally at 10 may be preferably used in conjunction with a mobile feed mixer apparatus, such as a truck 11 having a truck bed 12 and bearing a mixing hopper 13 thereon. FIG. 1 shows the improved feed dispenser apparatus of the present invention with the spout 14 retracted into its upward position for closing the opening of the auger troughs 15,15. The embodiment shown in FIG. 1 utilizes two augers within the auger troughs 15,15; however, one auger trough or more than two auger troughs can be used in alternative embodiments within the intended spirit and scope of the present invention.

Figure 5:
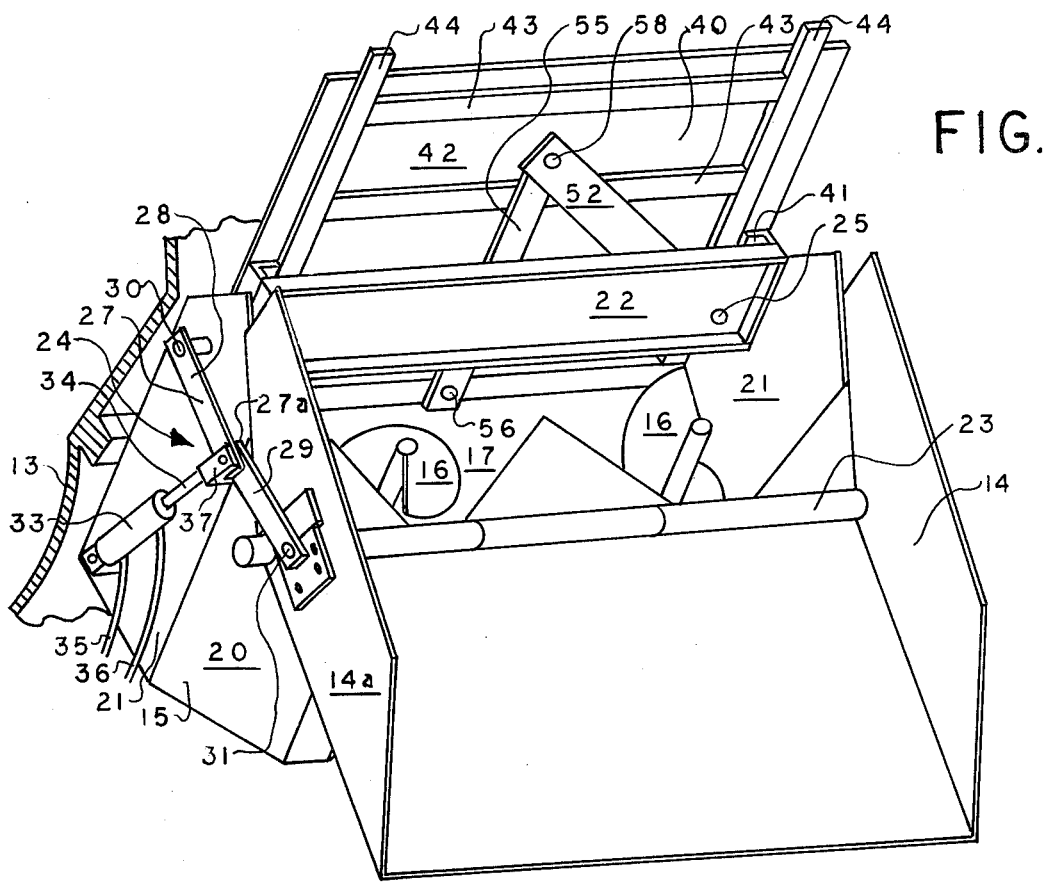
FIG. 5 is a perspective view showing the apparatus in conveying disposition with the outlet door raised and the feed spout extended to illustrate the relationship of the augers to the auger trough and further to illustrate more particularly the spout retraction and extension mechanism.

Referring now to FIG. 5 in particular, feed dispenser apparatus 10 includes augers 16,16 driven by auger power means (not shown), which augers communicate with the discharge opening 17 of the mixing hopper 13 for conveying the mixed feed upwardly on the auger troughs 15,15 to the retractable spout 14 for discharge into cattle feeders at the proximal end of augers 16,16. Auger troughs 15,15 include bottom, side, and top support portions 20,21,22. Bottom and side portions 20,21 contain at least the lower longitudinal portion of augers 16,16. In a preferred embodiment the bottom portion 20 of an auger trough 15 is in the form of a truncated triangle shape, although a partially cylindrical, concave wall may be utilized. In either case, the bottom portions 20 of auger troughs 15,15 are disposed in longitudinally spaced and closely disposed relationship to the auger for containing approximately 120°-180° of the transverse cross-section of the augers.

The auger trough bottom portion 20 has a lip 22 which carries the spout hinge 23. The spout 14 is mounted for rotation about the axis of spout hinge 23, whereby spout 14 may be extended for dispensing feed as shown in FIG. 5, or may be retracted for transportation as shown in FIG. 1. One side portion 21 of trough 15 serves as supplementary means for supporting spout 14 through the spout retraction and extension means shown generally at 24.

Figure 4:
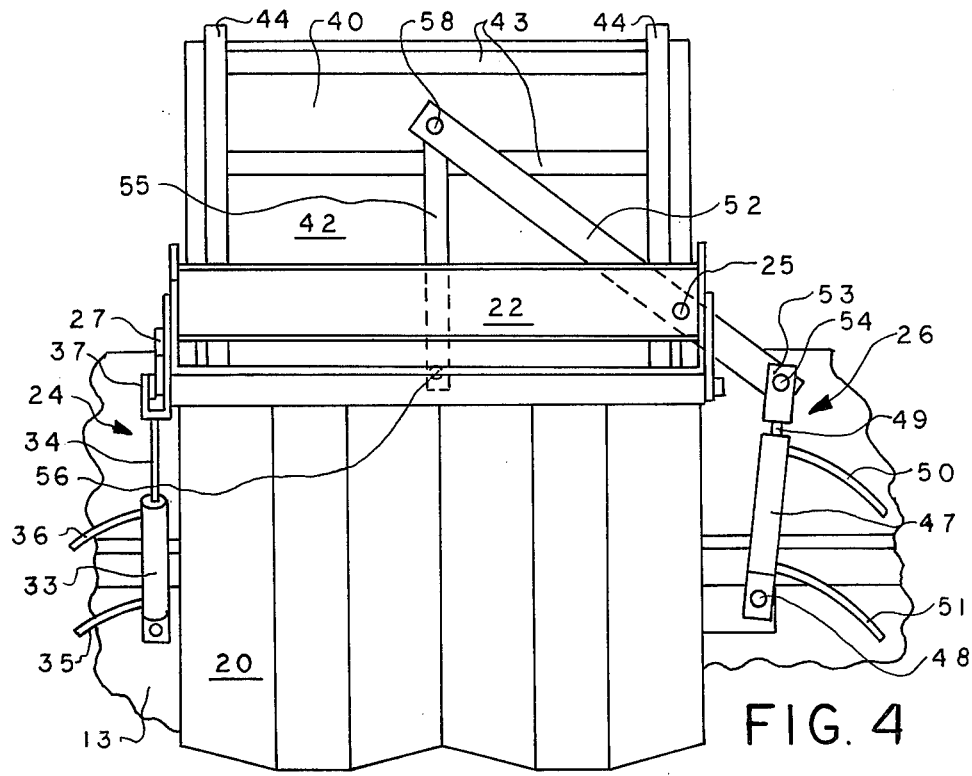
FIG. 4 taken along 4—4 of FIG. 2 is a bottom view showing the lever arrangement for opening and closing the slideable outlet door in response to retraction and extension respectfully of the attached fluidic cylinder, and also showing at the left portion of FIG. 4 the spout extension and retraction mechanism.

Referring now also to FIG. 4, top support portion 22 of auger troughs 15,15 provides the fulcrum means 25 for the outlet door opening and closing mechanism, shown generally at 26.

Figure 3:
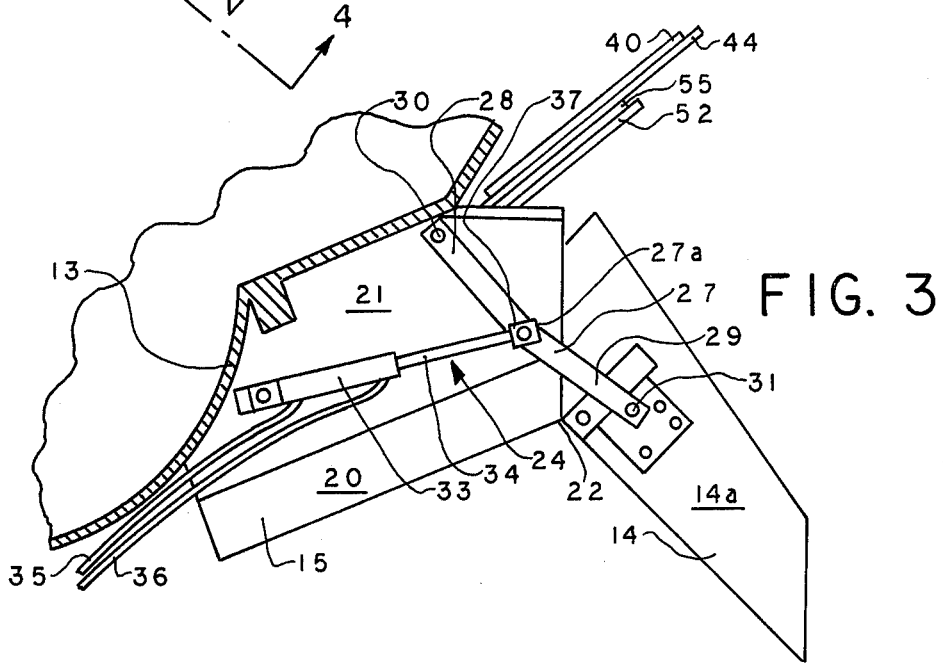
FIG. 3 taken along 3—3 of FIG. 1 is a side elevational view showing the auger trough mounted on the mixing hopper, the feed spout shown in extended position, the slideable outlet door also shown in its upward position and the details of the fluidic cylinder-driven elbow hinge, which upon folding retracts the feed spout into its upward position for transportation.

Referring to FIGS. 3 and 5 in particular and also to FIG. 4, feed spout retraction and extension mechanism 24 comprises an elbow hinge 27 which is foldable at a central portion 27a thereof. Elbow hinge 27 comprises two members 28,29 which are pivotably and longitudinally connected at the central portion of elbow hinge 27. One of the elbow hinge members 28 is pivotably attached at 30 to the exterior surface of auger trough side portion 21 for turning thereon. The other elbow hinge member 29 is connected by a pin 31 to side wall 14a of the feed spout 14. A fluidic cylinder 33 having a rod 34 and supply lines 35,36 is attached preferably by a U-bracket 37 to central portion 27a of elbow hinge 27. Upon extension of fluidic cylinder rod 34 elbow hinge 27 straightens, as shown in FIGS. 3 and 5. Upon retraction of fluidic cylinder rod 34, top elbow hinge member 28 is turned about its pivotable mount 30 in a clockwise direction, as illustrated, thereby to fold elbow hinge 27 and as a result to retract feed spout 14 upwardly into closed disposition.

Figure 2:
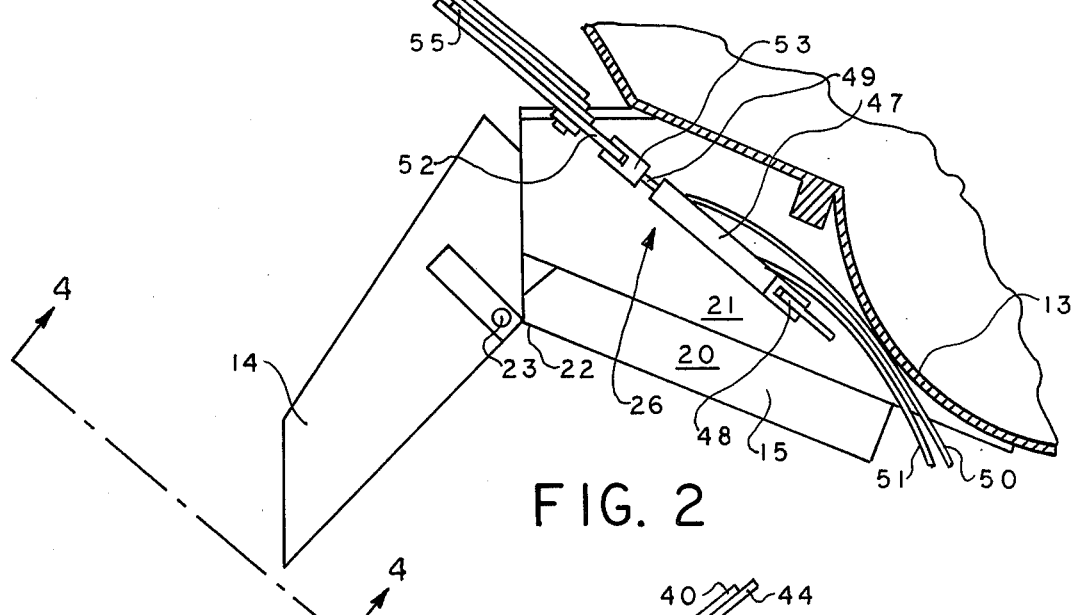
FIG. 2 taken along line 2—2 of FIG. 1 is a side elevational view showing the details of the exterior of the auger troughs mounted upon the mixing hopper, the retractable feed spout shown in extended position, the slideable outlet door shown in its upward, operative position opening the hopper to the augers, and the fluidic cylinder and lever drive system for opening such outlet door.

Referring now to FIGS. 2, 4, and 5, the outlet door 40 is slideably mounted upon tracks 41 for sliding upwardly to open mixing hopper 13 to augers 16,16 and for sliding downwardly to close mixing hopper 13, such as for transportation. Outlet door 40 comprises a sheet facing 42 and may be preferably re-enforced with horizontal and vertical re-enforcing members 43,44. Vertical re-enforcing members 44 may also serve as tracking means.

As shown particularly in FIG. 4, the outlet door raising and lowering mechanism 26 comprises a fluidic cylinder 47 having a connected end pivotably mounted at 48 to a stationary means, such as for example truck bed 12 or mixing hopper 13. Fluidic cylinder 47 includes a rod 49 for extension and retraction in response to the fluid supplied by fluidic cylinder supply lines 50,51. Fluidic cylinder rod 49 is pivotably connected to a lever 52 preferably by a U-bracket 53 at pin 54. Lever 52 is fulcrummed by means of pivotable mounting 25 carried by auger trough top support portion 22. A bar 55 is pivotably mounted at the proximal end thereof at pin 56 to a lower portion of outlet door 40. The distal end of bar 55 is pivotably mounted at pin 58 to the second end of lever 52. Thus, when the fluidic cylinder rod 49 retracts, as shown in FIGS. 2, 5 and FIG. 4 in particular, lever 52 turns clockwise as illustrated, thereby to raise slideable outlet door 40 by sliding it upwardly on its tracks 41 in order to open mixing hopper 13 to augers 16,16. Conversely, when fluidic cylinder rod 49 extends, lever 52 turns about fulcrum 25 counterclockwise as illustrated, whereby outlet door 40 slides on its tracks 41 downwardly to close mixing hopper 13 to augers 16,16, as during transportation.

In a preferred embodiment both fluidic cylinders 35 and 47 for feed spout retraction and extension mechanism 24 and for the outlet door raising and lowering the mechanism 26 may be initiated by a common control switch for simultaneous and synchronous operation. Preferably, the drive to the augers (not shown) may be initiated by a separate control switch in order that the flow of feed from troughs 15,15 to spout 14 and downwardly into the cattle feeders may be selectively controlled both as to periodicity, duration and quantity of dispensing.

The materials used are preferably ¼ inch steel, for strength and durability. No particular criticality is attached to specific dimensions and the improved feed mixer of the present invention may be constructed in a wide variety of sizes and shapes for optimum efficiency in conjunction with the various sizes of mixing hoppers.

The basic and novel characteristics of the improved feed dispenser apparatus of the present invention and the advantages thereof will be readily understood from the foregoing disclosure by those skilled in the art. It will become readily apparent that various changes and modifications may be made in the form, construction and arrangement of the combination apparatus set forth hereinabove without departing from the spirit and scope of the invention. Accordingly, the preferred and alternative embodiments of the present invention set forth hereinabove are not intended to limit such spirit and scope in any way.

What is claimed is:

1. An improved feed dispenser for conveying a flow of mixed feed from a discharge opening of a mixing hopper and for directing the flow exiting the dispenser, said dispenser comprising:
   at least one auger communicating with the discharge opening of the mixing hopper;
   auger trough means, having bottom, side and top portions, for containing at least the lower longitudinal portion of said auger, said trough means extending upwardly from said discharge opening of said mixing hopper and terminating in a lip portion at the distal end thereof;
   an outlet door slideably disposed between said discharge opening of said mixing hopper and said trough means;
   means connected to said outlet door for sliding said outlet door to communicate the proximal end of said trough means with the mixing hopper, said means comprising:
   lever means fulcrummed at a central portion thereof;
   a fluidic cylinder having a connected end and an operative end and attached at its operative end to a first end of said lever means; and
   bar means pivotably mounted at one end thereof to said slideable door, said bar means pivotably connected at the other end thereof to the second end of said lever means,
   whereby when said fluidic cylinder retracts said attached first end of said lever is drawn toward said cylinder turning said lever means about to central fulcrum, thereby to propel said slideable door in a direction opposite to the retraction;
   retractable spout means disposed at the distal end of said trough means for closing the distal end of said trough means when in a first position and for directing the flow of the feed existing said trough means when in a second position; and
   means connected to said spout means for moving said spout means between the first and second positions.

2. The improved feed dispenser of claim 1 wherein said trough means are in the form of partially cylindrical concave wall means disposed in longitudinally spaced relationship to said auger for partially containing said auger.

3. The improved feed dispenser of claim 1 wherein said partially cylindrical concave wall means is closely disposed to said auger through 120°–180° of its transverse cross-section.

4. The improved feed dispenser of claim 1 wherein said lever means is fulcrummed upon the top portion of said trough means.

5. The improved feed dispenser of claim 1 wherein said bar means extends longitudinal to the direction of sliding of said door.

6. The improved feed dispenser of claim 1 wherein said fluidic cylinder is pivotably attached to stationary means at its connected end.

7. The improved feed dispenser of claim 1 wherein the fluidic cylinder is attached to the mixing hopper.

8. The improved dispenser of claim 1 wherein said spout retracting means and said means for sliding the outlet door are synchronized for simultaneous operation.

9. The improved dispenser of claim 1 wherein said spout retracting means comprises:
   spout hinge means for pivotably connecting said spout means to said trough means;
   an elbow hinge foldable in a center portion thereof, said elbow hinge having two ends, one end pivotably attached to the side portion of said trough and the other end pivotably attached to said spout; and
   fluidic cylinder means attached to said elbow hinge, for folding the elbow hinge at the center portion thereof to impel the spout to retract by turning on the spout hinge means upwardly, and for extending the elbow hinge means to impel the spout to extend by turning on the spout hinge means downwardly.

10. The improved feed dispenser of claim 9 wherein said fluidic cylinder is pivotably anchored to stationary means.

11. The improved feed dispenser of claim 9 wherein said elbow hinge comprises two members pivotably and longitudinally connected, whereby said elbow hinge may be extended and retracted by the fluidic cylinder to extend and retract said spout.

12. The improved dispenser of claim 1 wherein said trough means are of truncated triangular shape in cross-section.

* * * * *